United States Patent [19]

Gower

[11] 3,768,533

[45] Oct. 30, 1973

[54] VEHICLE TIRE PROTECTION ASSEMBLY

[76] Inventor: Roger L. Gower, Rm. 302, 1911 Jefferson Davis Hwy., Arlington, Va. 22202

[22] Filed: Dec. 30, 1971

[21] Appl. No.: 214,065

[52] U.S. Cl. ................................ 152/239, 152/243
[51] Int. Cl. ........................................... B60c 27/06
[58] Field of Search ................... 152/243, 239, 171, 152/176

[56] References Cited
UNITED STATES PATENTS

| | | |
|---|---|---|
| 3,490,511 | 1/1970 | Muller et al. ...................... 152/243 |
| 1,019,830 | 3/1912 | Pejchar .............................. 152/171 |
| 1,285,722 | 11/1918 | Jones ................................. 152/171 |
| 3,310,092 | 3/1967 | Rieger ............................... 152/171 |

*Primary Examiner*—James B. Marbert

[57] ABSTRACT

This tire protection assembly comprises a succession of rings connected together by metal straps and forming a net having a width greater then the width of the tire tread and being joined to form an endless band for mounting upon the vehicle tire, thus creating a protective armor for the tire.

5 Claims, 8 Drawing Figures

VEHICLE TIRE PROTECTION ASSEMBLY

The product of this invention is a flexible armor-like assembly for mounting upon the inflated tire of a vehicle wheel. Its purpose is to provide a metallic shield for the protection of the tire from sharp and jagged rocks, such as are found in mines and quarries. Tractor owners experience heavy losses in these operations because the tires are cut or torn in the course of their use upon rocky terrain, and protection for the tires is essential in order to eliminate such losses.

While many solutions to this problem have been proposed, the devices are often heavy, with large rigid members, and present the risk of damage to the vehicle in the event the device is broken and such members become entangled around the axles of the tractor.

The present invention employs relatively light-weight rings connected together by flat metal straps, each having the ends bent back on a 180° angle so that in a side view the member has the appearance of an ellipse or a truncated rectangle with one open side. After the straps are connected together with the rings, a plate-like member is integrally attached, as by welding, over the open side of each strap. The said plate-like member lies in a plane above the outer face of the strap, which in turn is disposed above the ring. Thus the tire is removed from cutting or tearing contact with rocks by reason of the combined thicknesses of the ring, the strap and the plate. Furthermore, the mesh of the assembly may be made small enough to prevent the tire from being reached by rocks of a size sufficient to inflict serious damage upon the tire.

Traction seldom presents a problem in mines and quarries as it does in logging operations and farming, since the terrain in these latter areas is usually soft and may be wet or snow-covered. Therefore, in mines and quarries the principal problem requiring an answer is the protection of the tire, and a flexible armor-like covering enables the vehicle to achieve full traction power and at the same time protects the tires from damage.

For a better understanding of the invention, reference is made to the accompanying drawings, in which FIG. 1 is a top plan of a segment of this assembly;

Referring more particularly to the drawings,

Each of the rings 11 has one end of a strap 12 connected thereto, in such manner that the opening 13 on the side of the strap is outwardly disposed when the assembly is mounted upon a vehicle tire. A plate 14 is integrally attached upon the open side of each strap.

Figure 1:
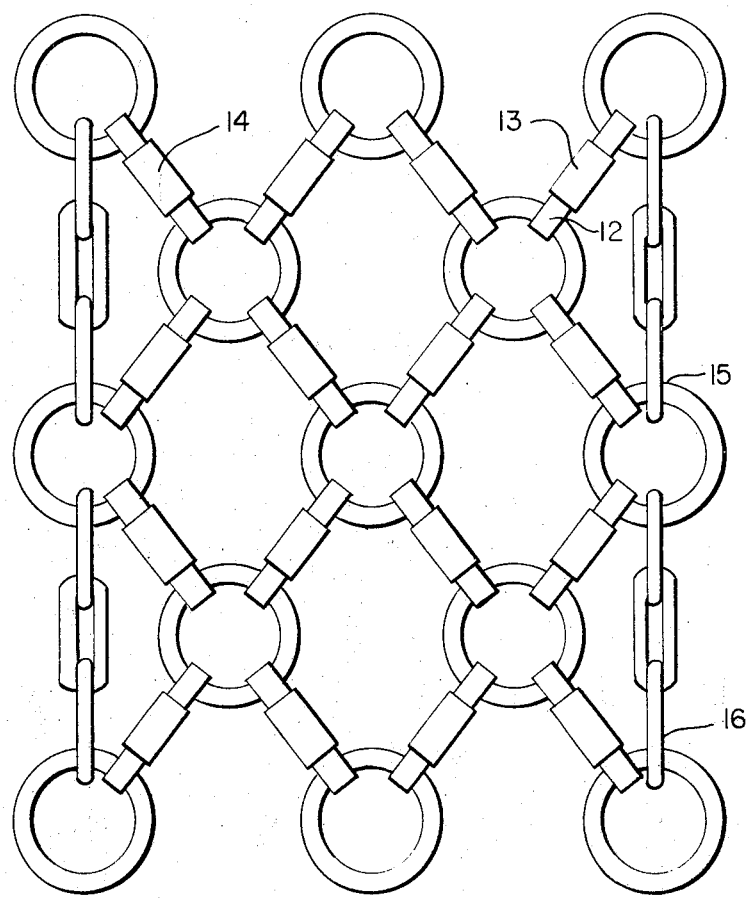
Figure 2:
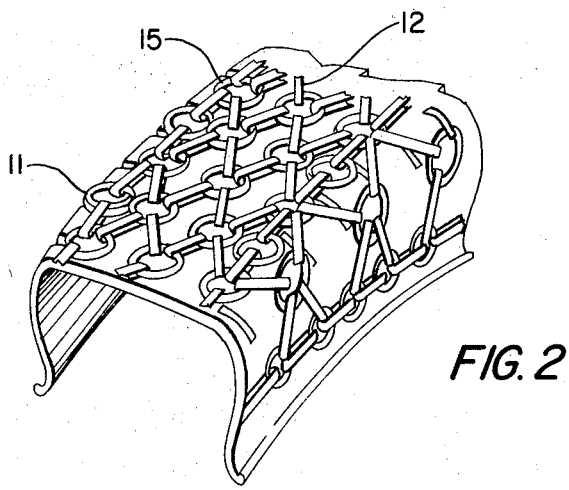
FIG. 2 shows a perspective view of the assembly, mounted on a vehicle tire.
Figure 3:
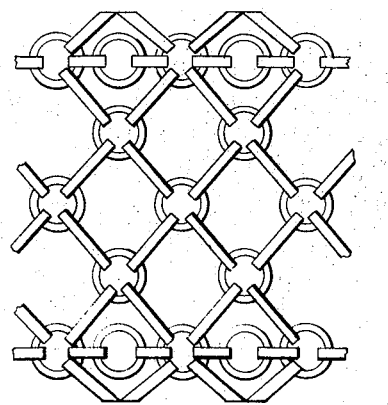
FIG. 3 shows a top plan of a segment of the assembly, in lateral expansion.
Figure 4:
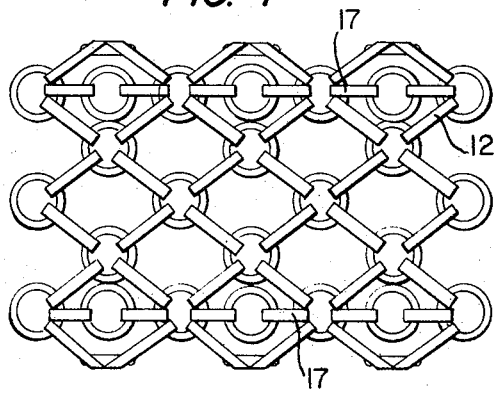
FIG. 4 is a top plan of a segment of the assembly, in linear expansion.
Figures 5, 6, 7, 8:
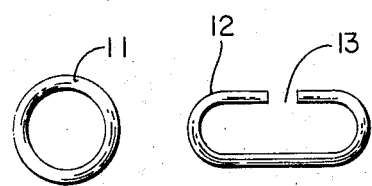
FIG. 5 shows the ring used in this assembly.
FIG. 6 is a side elevation of the connecting strap, bent for connection between rings.
FIG. 7 is a top plan of the plate which is attached to the strap.
FIG. 8 is a side elevation of a connecting strap having the plate integrally attached.

The side elevations of FIGS. 6 and 8 show more clearly the configuration of the straps, and the integrally attached plate appears in FIG. 8.

The side chains may be integrally connected to the adjacent rings, as by links 15; or detachable means may be used. Shackle 16 is an example of such detachable connecting means; other connectors may be employed, if desired.

It will be seen that the flexibility of this structure permits either lateral or linear expansion thereof, thus readily fitting the structure over the curved surface of the tire.

While the drawings show the rings disposed in successions of three and two, this is done for simplification and not with an intent to limit the number of rings or the size of the mesh that is created by the rings and the plate-covered straps. The number of chain links used on the sides of the assembly is governed by the amount and direction of expansion that is desired. These chain links may be connected to the rings by welding, or hooks or other connector devices may be employed. The chains are shown in the accompanying drawings for the purpose of clarifying the nature of the border of this assembly.

The lasting qualities of this chain assembly are assured because, in the event of breakage or detachment of a plate from a strap, a new plate can be welded in place and the assembly continued in service, with full protective efficiency.

The invention having been thus disclosed, what is claimed is:

1. In a vehicle tire protection assembly comprising rings having straps attached thereto and connected therebetween, said rings and straps forming a flexible net mountable upon the tire of a vehicle wheel, the improvement of forming said strap connector members in such manner as to provide an open space on one side thereof, intermediate the adjacent rings, and a plate integrally attached upon said open side of said strap member to effect the closure of said opening and to provide an elevation of the outer surface of said plate above the plane of said rings and said straps.

2. The invention of claim 1 wherein said straps are disposed in such manner that the closed sides thereof are contiguous to the tread of said vehicle tire and the open sides are outwardly disposed to place the closure plates into direct contact with the ground surface upon which the vehicle travels.

3. The invention of claim 1 wherein said straps are elongated flat metal members, each end of each member being turned upon itself through an arc of substantially 180° and on a radius slightly greater than the radius of the bar stock forming said ring, the ends of said member being disposed a distance apart sufficient to permit passage of the ring therethrough, and the opening thus formed being closed subsequent to assembly thereof with said rings by a plate member, which plate provides traction for said vehicle while said ring and strap assembly serves to protect the said vehicle tire from damage caused by rough terrain.

4. The invention of claim 1 wherein said tire protection assembly is retained upon said vehicle tire by a border of conventional chain connected to and extending between the outermost rings on each side of said assembly.

5. The invention of claim 4 wherein said conventional chain may be optionally connected integrally or detachably to said rings.

* * * * *